US011185025B2

(12) United States Patent
Fujisawa et al.

(10) Patent No.: US 11,185,025 B2
(45) Date of Patent: Nov. 30, 2021

(54) CULTIVATION METHOD, CULTIVATION EQUIPMENT, AND CULTIVATION APPARATUS

(71) Applicant: Fujisawa kenki Co., Ltd., Mie (JP)

(72) Inventors: Hisafumi Fujisawa, Mie (JP); Eiji Higuchi, Nara (JP); Osamu Hirata, Osaka (JP)

(73) Assignee: FUJISAWA KENKI CO., LTD., Mie (JP)

( * ) Notice: Subject to any disclaimer, the term of this patent is extended or adjusted under 35 U.S.C. 154(b) by 0 days.

(21) Appl. No.: 17/059,255

(22) PCT Filed: Jul. 2, 2019

(86) PCT No.: PCT/JP2019/026227
§ 371 (c)(1),
(2) Date: Nov. 27, 2020

(87) PCT Pub. No.: WO2020/017315
PCT Pub. Date: Jan. 23, 2020

(65) Prior Publication Data
US 2021/0204499 A1 Jul. 8, 2021

(30) Foreign Application Priority Data
Jul. 19, 2018 (JP) ............... JP2018-135511

(51) Int. Cl.
*A01G 31/04* (2006.01)
*A01G 9/24* (2006.01)
*A01G 31/06* (2006.01)

(52) U.S. Cl.
CPC ............. *A01G 31/04* (2013.01); *A01G 9/249* (2019.05); *A01G 31/06* (2013.01)

(58) Field of Classification Search
CPC ........ A01K 31/04; A01K 31/02; A01K 31/06; A01G 9/249
See application file for complete search history.

(56) References Cited

U.S. PATENT DOCUMENTS

| 2014/0017043 A1* | 1/2014 | Hirai | A01G 31/06 414/267 |
| 2015/0107154 A1* | 4/2015 | Visser | A01G 9/249 47/66.6 |

(Continued)

FOREIGN PATENT DOCUMENTS

| GB | 2550186 A | 11/2017 |
| JP | H3232434 A | 10/1991 |

(Continued)

OTHER PUBLICATIONS

International Search Report in PCT/JP2019/026227, dated Sep. 17, 2019. 4pp.
Wrriten Opinion in PCT/JP2019/026227, dated Sep. 17, 2019. 6pp.

*Primary Examiner* — Monica L Barlow
*Assistant Examiner* — Aaron M Rodziwicz
(74) *Attorney, Agent, or Firm* — Hauptman Ham, LLP (57) ABSTRACT

A cultivation method repeats a cultivation step, an exporting step, a working step, and an importing step in this order. In the cultivation step, plants are cultivated in a state where a plurality of cultivation units are accommodated in a storage rack. A plurality of cultivation vessels are disposed in the plurality of cultivation units. Each of the plurality of cultivation vessels is configured to hold the plants and a culture solution. In the exporting step, at least one of the cultivation units is transported by a transportation device from the storage rack to a workstation. In the working step, a new culture solution is supplied to a plurality of cultivation (Continued)

vessels. In the importing step, the cultivation unit is imported into the storage rack by the transportation device.

12 Claims, 7 Drawing Sheets

(56) References Cited

U.S. PATENT DOCUMENTS

| | | | | |
|---|---|---|---|---|
| 2016/0106048 A1* | 4/2016 | Moghaddam | ........ | A01G 31/042 |
| | | | | 47/62 R |
| 2017/0311560 A1* | 11/2017 | Agari | ...................... | A01G 31/02 |
| 2018/0014486 A1* | 1/2018 | Creechley | .............. | A01G 31/06 |
| 2019/0335676 A1* | 11/2019 | Solomon | .............. | A01G 31/042 |
| 2020/0367455 A1* | 11/2020 | Vesty | ................... | A01G 31/042 |

FOREIGN PATENT DOCUMENTS

| | | | | |
|---|---|---|---|---|
| JP | 2012200222 A | 10/2012 | | |
| JP | 2014117195 A | 6/2014 | | |
| JP | 2016189714 A | 11/2016 | | |
| WO | WO-2017024353 A1 * | 2/2017 | ............. | A01G 9/047 |

\* cited by examiner

FIG. 7

CULTIVATION METHOD, CULTIVATION EQUIPMENT, AND CULTIVATION APPARATUS

RELATED APPLICATIONS

The present application is a National Phase of International Application Number PCT/JP2019/026227 filed Jul. 2, 2019, and claims priority based on Japanese Patent Application No. 2018-135511, filed Jul. 19, 2018.

TECHNICAL FIELD

The present disclosure relates to a cultivation method, cultivation equipment, and a cultivation apparatus.

BACKGROUND ART

Patent Literature 1 describes a multi-stage type plant culture device including a cultivation bed through which a culture solution necessary for growth of plants circulates and which is disposed in each of the stages.

In order to increase the yield amount per unit area in the multi-stage type plant culture device described in Patent Literature 1, the number of stages has to be increased.

Increasing the number of stages, however, increases the number of pipes for supplying and discharging the culture solution to the cultivation beds. This complicates the device. In addition, a thick pipe and/or a large-capacitance pump are/is required to supply the culture solution to the cultivation beds in high stages, which may increase the size of the device.

CITATION LIST

Patent Literature

Patent Literature 1: JP H03-232434 A

SUMMARY OF INVENTION

An object of the present disclosure is to provide a cultivation method, cultivation equipment, and a cultivation apparatus while complication and/or an increase in size of the apparatus are/is suppressed even with an increased number of cultivation stages.

A cultivation method of one aspect according to the present disclosure includes a cultivation step, an exporting step, a working step, and an importing step. The cultivation step is a step of cultivating plants in a state where a plurality of cultivation units are accommodated in a storage rack. A plurality of cultivation vessels are disposed in the plurality of cultivation units. Each of the plurality of cultivation vessels holds the plants and a culture solution. The exporting step is a step of exporting at least one cultivation unit of the plurality of cultivation units by a transportation device from the storage rack to a workstation apart from the storage rack. The working step is a step of supplying a new culture solution to the plurality of cultivation vessels disposed in the at least one cultivation unit at the workstation. The importing step is a step of importing, into the storage rack from the workstation, the at least one cultivation unit, for which the supplying of the new culture solution is completed, by the transportation device. In the cultivation method of the one aspect, the cultivation step, the exporting step, the working step, and the importing step are performed in this order.

Cultivation equipment of one aspect according to the present disclosure includes a storage rack, a plurality of cultivation units, a plurality of cultivation vessels, a transportation device, and a supply device. The plurality of cultivation units are configured to be accommodated in the storage rack. The plurality of cultivation vessels are disposed in each of the plurality of cultivation units. Each of the plurality of cultivation vessels is configured to hold plants and a culture solution. The transportation device is configured to transport at least one cultivation unit of the plurality of cultivation units between the storage rack and a workstation apart from the storage rack. The supply device is configured to supply a new culture solution to the plurality of cultivation vessels disposed in the at least one cultivation unit at the workstation.

Moreover, a cultivation apparatus of one aspect according to the present disclosure includes a storage rack, a plurality of cultivation units, and a plurality of cultivation vessels. The plurality of cultivation units are configured to be removably and insertably accommodated in the storage rack. The plurality of cultivation vessels are disposed in each of the plurality of cultivation units. Each of the plurality of cultivation vessels is configured to hold plants and a culture solution. Neither the storage rack nor each of the plurality of cultivation units has a pipe for supplying a culture solution to the plurality of cultivation vessels.

DESCRIPTION OF EMBODIMENTS

Figure 1:
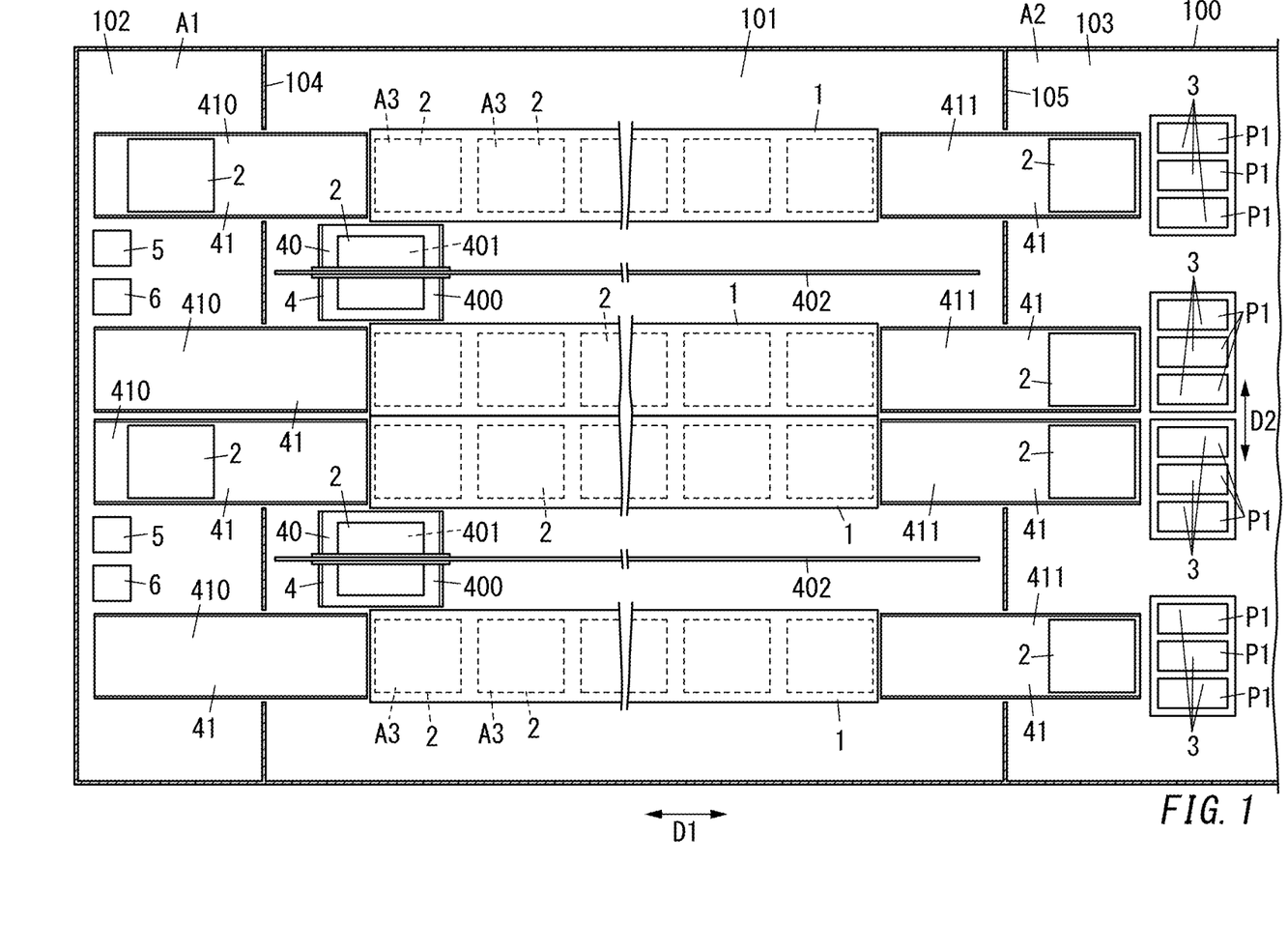
FIG. 1 is a plan view schematically illustrating cultivation equipment of one embodiment according to the present disclosure.

FIG. 1 shows a schematic diagram of cultivation equipment of one embodiment. The cultivation equipment of the present embodiment is equipment for hydroponic culture of plants P1 as cultivation targets. The cultivation equipment includes a storage rack 1, a plurality of cultivation units 2, a plurality of cultivation vessels 3, a transportation device 4, a supply device 5, and a discharge device 6.

Figure 4A:
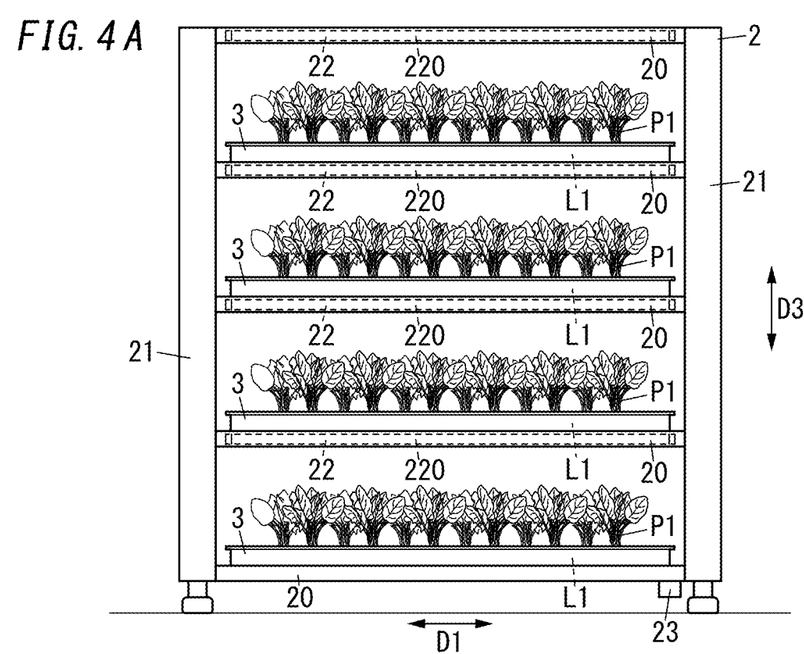
FIG. 4A is a front view illustrating a cultivation unit of the cultivation equipment.
Figure 4B:
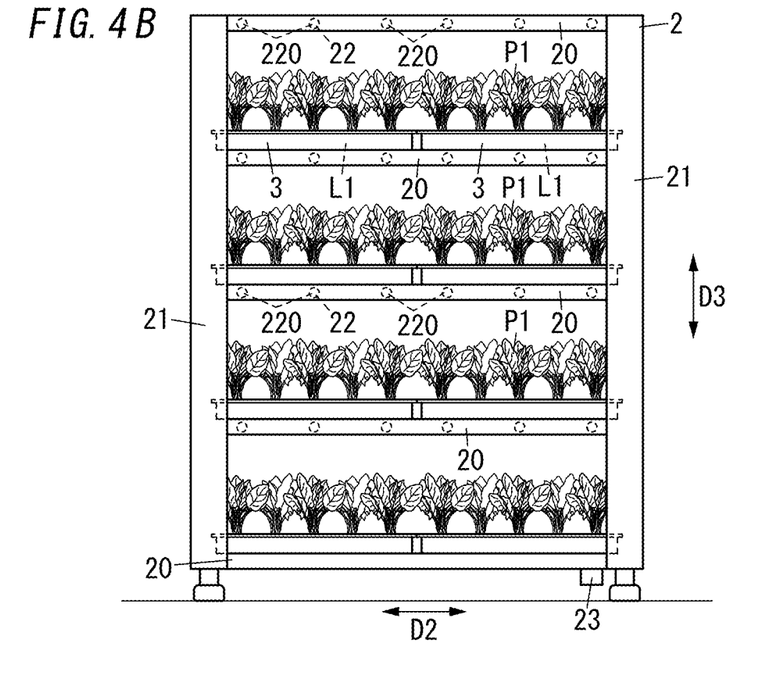
FIG. 4B is a side view illustrating the cultivation unit.

As illustrated in FIGS. 4A and 4B, each of the plurality of cultivation vessels 3 is a cultivation container that holds plants P1 and a culture solution L1 for growth of the plants P1. Each of the plurality of cultivation units 2 is a rack including a plurality of support plates 20 vertically aligned, and the plurality of cultivation vessels 3 are disposed in each of the plurality of cultivation units 2. As illustrated in FIG.

1, the storage rack 1 is a rack in which the plurality of cultivation units 2 are removably and insertably accommodated.

The transportation device 4 is configured to transport at least one cultivation unit 2 of the plurality of cultivation units 2 between the storage rack 1 and workstations A1 and A2 apart from the storage rack 1. The transportation device 4 includes a stacker crane 40 and a plurality of conveyor devices 41.

The supply device 5 is configured to supply a new culture solution L2 to the plurality of cultivation vessels 3 disposed in the at least one cultivation unit 2 at the workstation A1. The discharge device 6 is configured to discharge the culture solution L1 held by the plurality of cultivation vessels 3 disposed in the at least one cultivation unit 2 at the workstation A1.

The cultivation equipment of the present embodiment is disposed in a cultivation building 100. The cultivation building 100 includes a cultivation chamber 101 and workrooms 102 and 103. In the present embodiment, the workroom 102 is a room which is separated by a wall 104 to be different from the cultivation chamber 101. The workroom 103 is a room which is separated by a wall 105 to be different from the cultivation chamber 101. The workroom 102 and the workroom 103 are rooms different from each other.

The cultivation chamber 101 is a room for cultivation of the plants P1, and the storage rack 1 is disposed in the cultivation chamber 101. The cultivation chamber 101 is set to have an environment with a temperature, humidity, and the like suitable for the cultivation of the plants P1. The workroom 102 is a room in which a discharge process of discharging the culture solution L1 and a supply process of supplying the new culture solution L2 are performed. The supply device 5 and the discharge device 6 are disposed in the workroom 102. A space in the workroom 102 is the workstation A1. The workroom 103 is a room in which a planting process of planting seedings of the plants P1 in the cultivation vessels 3 and a harvesting process of harvesting the plants P1 from the cultivation vessels 3 are performed. A space in the workroom 103 is the workstation A2.

In the cultivation chamber 101 and the workrooms 102 and 103, the transportation device 4 is disposed. Specifically, the stacker crane 40 is disposed in the cultivation chamber 101. Some conveyor devices 410 of the plurality of conveyor devices 41 are disposed to extend to both the cultivation chamber 101 and the workroom 102. Some conveyor devices 411 of the plurality of conveyor devices 41 are disposed to extend to both the cultivation chamber 101 and the workroom 103.

Subsequently, components of the cultivation equipment will be described in further detail.

The storage rack 1 is a rack elongated in one direction in the horizontal direction. The components are described below, where the longitudinal direction of the storage rack 1 is referred to as a direction D1, the short direction of the storage rack 1 is referred to as a direction D2, and the height direction of the storage rack 1 is referred to as a direction D3.

Figure 2:
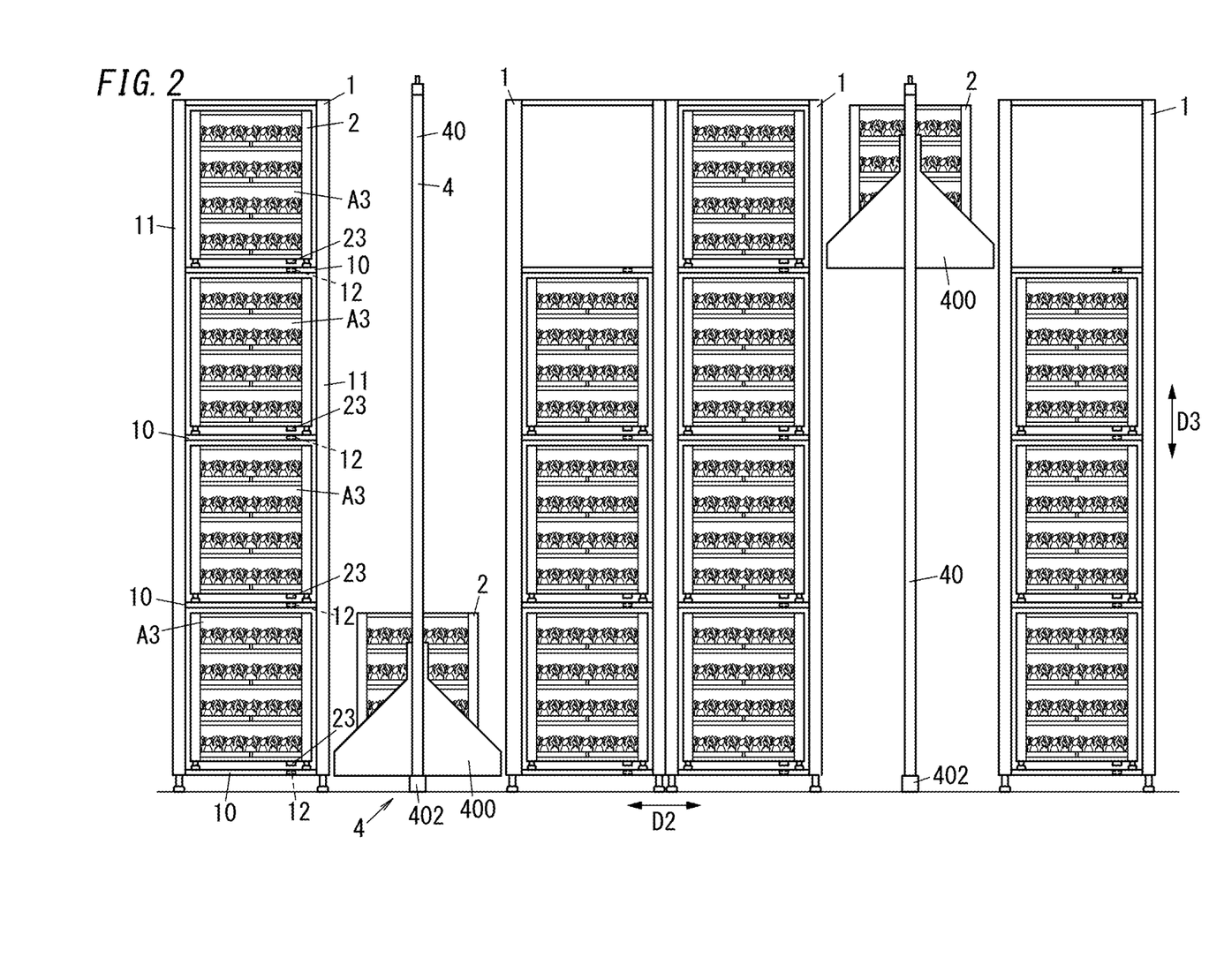
FIG. 2 is a side view schematically illustrating the cultivation equipment.
Figure 3:
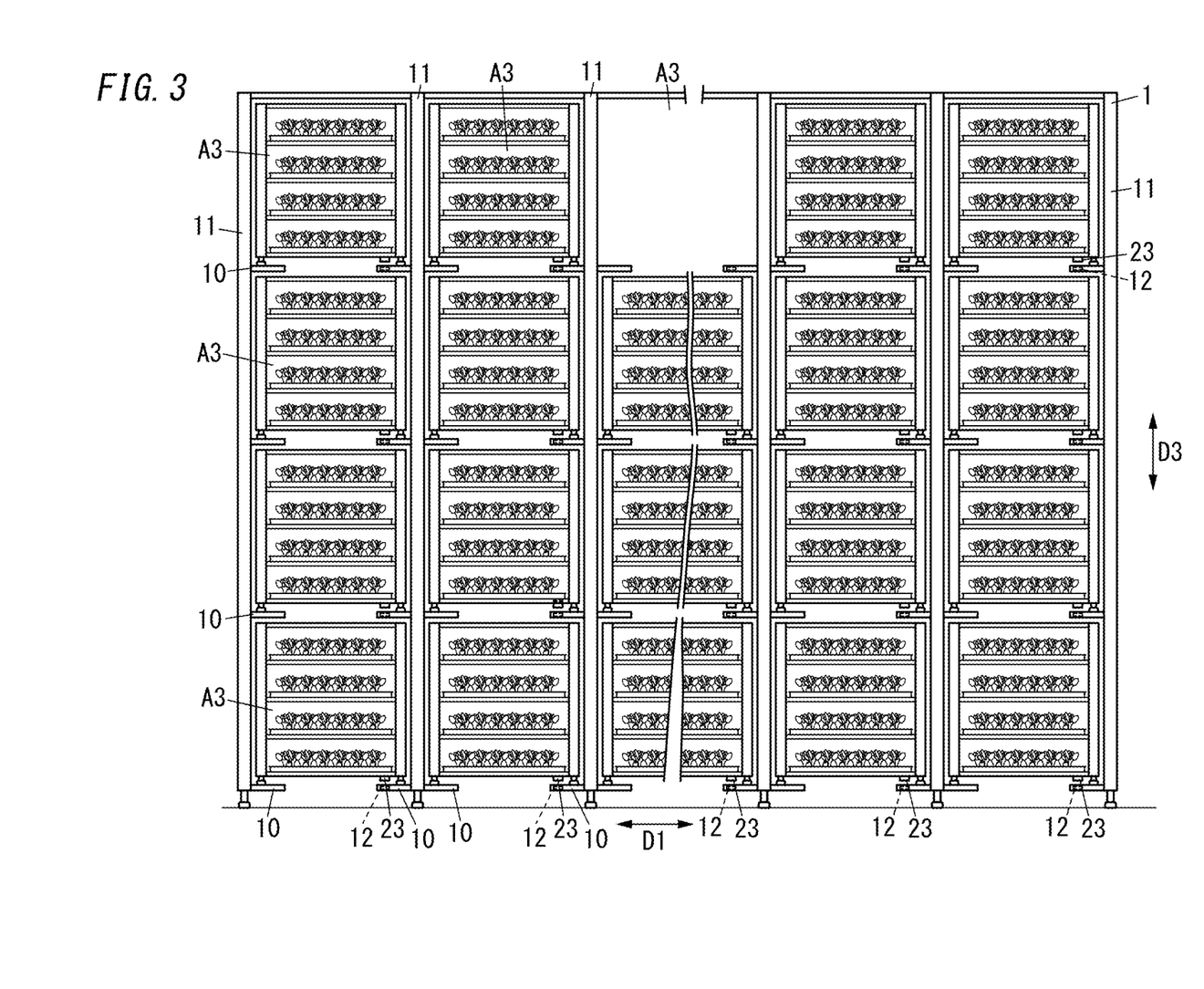
FIG. 3 is a front view schematically illustrating the cultivation equipment.

As illustrated in FIGS. 2 and 3, the storage rack 1 is a multi-stage rack including pairs of reception members 10 in each of the direction D1 and the direction D3, the reception members 10 in each pair being aligned at intervals in the direction D1. The storage rack 1 further includes a plurality of support pillars 11 that support the plurality of reception members 10. Each of the plurality of reception members 10 and the plurality of support pillars 11 is made of, for example, metal. In the present embodiment, the plurality of reception members 10 are supported in a cantilever manner by each pair of the support pillars 11 aligned in the direction D2.

The storage rack 1 has, for example, a length of 20 m in the direction D1, a length of 2.1 m in the direction D2, and a length of 10 m in the direction D3. The size of the storage rack 1 may be accordingly set depending on the size of the cultivation chamber 101 and the number of cultivation units 2 to be loaded.

As illustrated in FIGS. 1 and 2, the cultivation equipment of the present embodiment includes a plurality of storage racks 1. The plurality of storage racks 1 are aligned in the direction D2 and are parallel to each other. The plurality of storage racks 1 include pairs of storage racks 1, the storage racks 1 in each pair being located at intervals each corresponding to a space in which the stacker crane 40 is to be disposed. A pair of storage racks 1 and another pair of storage racks 1 aligned in the direction D2 are adjoined to each other. The number of storage racks 1 included in the cultivation equipment is accordingly set in accordance with the area and the like of the cultivation chamber 101.

As illustrated in FIGS. 2 and 3, the storage rack 1 further includes electricity transmitters 12 configured to supply electric power to electricity receivers 23 of irradiation devices 22 included in the cultivation units 2. The electricity transmitters 12 are provided to the respective reception members 10 located directly under the electricity receivers 23 of the plurality of reception members 10. Each electricity transmitter 12 obtains electric power by being electrically connected to a power supply device such as an electrical outlet.

The storage rack 1 includes a plurality of storage spaces A3 aligned in the direction D1 and the direction D3. Between each two storage spaces A3 adjacent to each other in the direction D3, corresponding two of the reception members 10 aligned at an interval in the direction D1 are provided. As illustrated in FIGS. 1 and 3, between each two storage spaces A3 adjacent to each other in the direction D1, a corresponding pair of support pillars 11 aligned at an interval in the direction D2 is provided. Each two storage spaces A3 adjacent to each other in the direction D1 are communicated to each other via a space between the corresponding pair of support pillars 11. In each of the plurality of storage space A3, one cultivation unit 2 is accommodated. Each two reception members 10 aligned at an interval in the direction D1 support the one cultivation unit 2.

As illustrated in FIGS. 4A and 4B, each of the plurality of cultivation units 2 is a multi-stage rack including the plurality of support plates 20 aligned at intervals in the direction D3 and a plurality of support pillars 21 supporting the plurality of support plates 20. Each of the plurality of support plates 20 and the plurality of support pillar 21 is made of, for example, metal.

The cultivation unit 2 has, for example, a length of 1.8 m in the direction D1, a length of 1.5 m in the direction D2, and a length of 2.0 m in the direction D3. In this case, various types of processes are easily performed on each cultivation vessel 3 on the cultivation unit 2.

In the present embodiment, each of the plurality of cultivation units 2 includes five support plates 20 and four support pillars 21. Each of the five support plates 20 has a rectangular shape in plan view and is supported at its four corners by the four support pillars 21. The number of support plates 20 included in the cultivation unit 2 may be accordingly set. In the present embodiment, each of the plurality of support plates 20 has a flat box shape with its lower side being open.

Each of the plurality of cultivation units 2 further includes the irradiation devices 22 for emitting light for growth toward the plurality of cultivation vessels 3. In the present embodiment, each irradiation device 22 includes a plurality of Light Emitting Diode (LED) lamps 220 attached to lower surfaces of each of the support plates 20 except for a lowermost support plate 20 of the plurality of support plates 20. In the present embodiment, the LED lamp 220 is a linear lamp. In the present embodiment, six LED lamps 220 are attached to the lower surface of each support plate 20. The LED lamp 220 has a shape elongated in the direction D1. The six LED lamps 220 are located on the lower surface of the support plate 20 at equal intervals in the direction D2. Each of the six LED lamps 220 is within a thickness of the support plate 20 having a box shape.

Each of the plurality of cultivation units 2 includes the electricity receiver 23 to which electric power is supplied from the electricity transmitter 12 of the storage rack 1. Between the electricity transmitter 12 and the electricity receiver 23, for example, wireless power supply is performed. The electricity receiver 23 is provided to, for example, the lowermost support plate 20 of the plurality of support plates 20. To the electricity receiver 23, each of the plurality of LED lamps 220 included in the cultivation unit 2 is electrically connected via an electric wire (not shown). Each of the plurality of LED lamps 220 emits light by electric power supplied from the electricity transmitter 12 to the electricity receiver 23.

Figure 6:
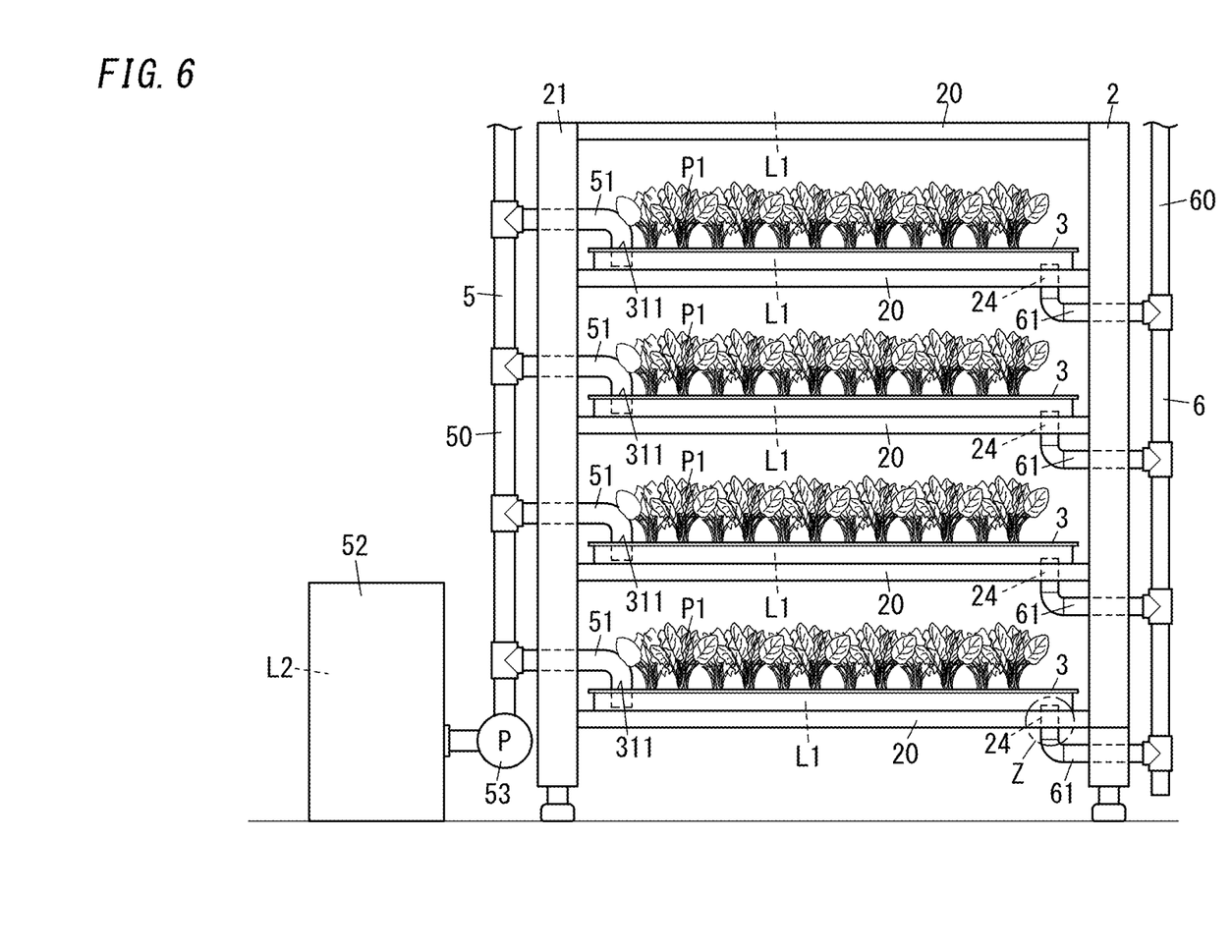
FIG. 6 is a front view illustrating an example of a supply device and a discharge device of the cultivation equipment.

As illustrated in FIG. 6, each of the support plates 20 except for an uppermost support plate 20 of the plurality of support plates 20 has a through hole 24 penetrating in the direction D3. The through hole 24 is a hole in which part of the discharge device 6 is to be inserted.

In the cultivation unit 2, the cultivation vessels 3 are disposed on the respective support plates 20 except for the uppermost support plate 20. In the present embodiment, two cultivation vessels 3 are disposed on each support plate 20 to be adjacent to each other in the direction D2.

Figures 5A, 5B, 5C:
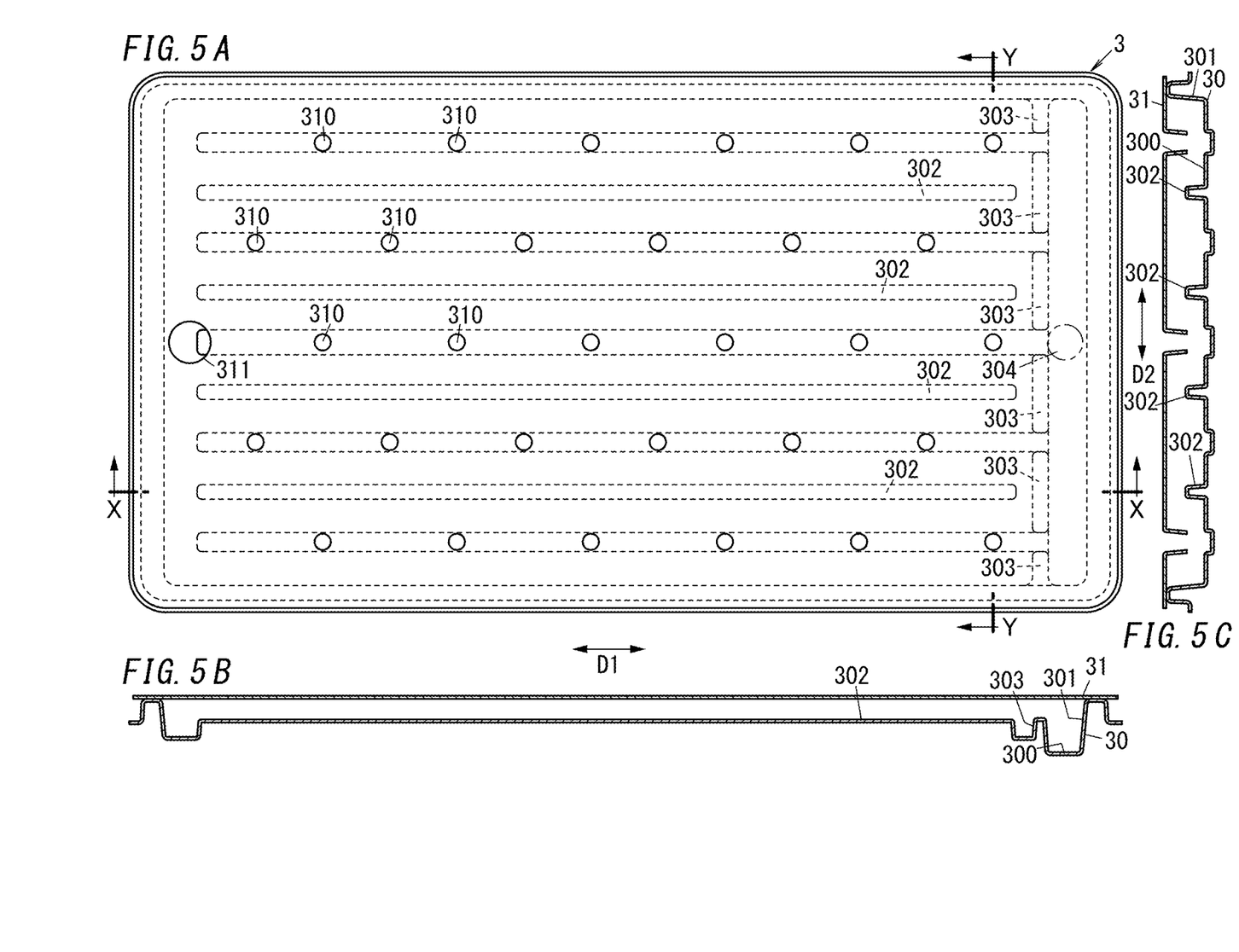
FIG. 5A is a plan view illustrating a cultivation vessel of the cultivation equipment.
FIG. 5B is a sectional view taken along line X-X of FIG. 5A.
FIG. 5C is a sectional view taken along line Y-Y of FIG. 5A.

The plurality of cultivation vessels 3 have the same structure, and as illustrated in FIGS. 5A, 5B, and 5C, each cultivation vessel 3 has a tray 30 having a flat box shape opening upward and a planting panel 31 fixed to an upper end of the tray 30. In the tray 30, the culture solution L1 or the new culture solution L2 are held. The cultivation vessel 3 has a rectangular shape in plan view. Each of the tray 30 and the planting panel 31 is a resin molded product and is formed by, for example, vacuum molding.

The cultivation vessel 3 has, for example, a length of 1300 mm in the direction D1, a length of 700 mm in the direction D2, and a length of 70 mm in the direction D3. In this case, the cultivation vessel 3 is easily portable.

The tray 30 includes a bottom wall 300 and a peripheral wall 301 rising from an outer peripheral edge of the bottom wall 300. The bottom wall 300 is provided with a plurality of projections 302 and 303 for wave dissipation. The projection 302 is a ridge elongated in the direction D1, and the projection 303 is a ridge elongated in the direction D2. In the present embodiment, four projections 302 are aligned at equal intervals in the direction D2, and six projections 303 are aligned at intervals in the direction D2 on one line on the bottom wall 300. Providing the plurality of projections 302 and 303 for wave dissipation on the bottom wall 300 suppresses the culture solution L1 (L2) from falling from the cultivation vessels 3 when the cultivation vessels 3 are transported by the transportation device 4.

Figure 7:
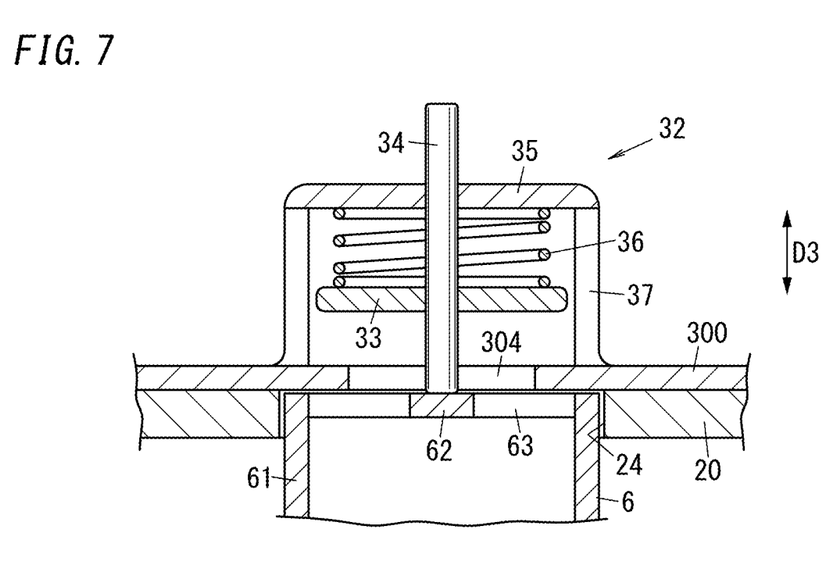
FIG. 7 is a sectional view illustrating part "Z" of FIG. 6.

The bottom wall 300 further has a drain hole 304 penetrating in the direction D3. The drain hole 304 is formed in one end of the bottom wall 300 in the direction DE As illustrated in FIG. 7, the bottom wall 300 is provided with a switching valve 32 configured to open/close the drain hole 304.

The switching valve 32 is configured to open the drain hole 304 to discharge water and close the drain hole 304 when water is not discharged. The switching valve 32 includes a closure plate 33 configured to close the drain hole 304, a shaft 34 penetrating the closure plate 33, a support plate 35 configured to movably support the shaft 34 in the direction D3, a coil spring 36 located between the closure plate 33 and the support plate 35, and a plurality of legs 37 for fixing the support plate 35 to the bottom wall 300. The plurality of legs 37 are apart from each other, and the culture solution L1 and L2 can pass between the plurality of legs 37.

The coil spring 36 presses the closure plate 33 against the bottom wall 300, and thereby, the switching valve 32 closes the drain hole 304. The switching valve 32 presses the shaft 34 to one side (upper side) in the direction D3, thereby moving the closure plate 33 in a direction (upward) away from the bottom wall 300 to open the drain hole 304.

As illustrated in FIGS. 5A and 5C, the planting panel 31 has a plurality of openings 310 for holding the plants P1. In the present embodiment, the planting panel 31 has five sets of six openings 310 aligned at equal intervals in a line in the direction D1, and the five sets are at equal intervals in the direction D2, that is, the planting panel 31 has a total of 30 openings 310.

The planting panel 31 further has an injection hole 311 penetrating in the direction D3. The injection hole 311 is formed in one end of the planting panel 31 in the direction D1.

The planting panel 31 is fixed to the peripheral wall 301 of the tray 30 by welding or the like. This suppresses the culture solution L1 (L2) from falling through a space between the planting panel 31 and the tray 30 when the transportation device 4 transports the cultivation vessel 3.

As illustrated in FIGS. 1 and 2, the transportation device 4 includes a plurality of stacker cranes 40 and the plurality of conveyor devices 41. Each stacker crane 40 is disposed on a floor of the cultivation chamber 101 to be located between a pair of storage racks 1 aligned at an interval in the direction D2.

The stacker crane 40 includes a loading platform 400, a fork 401 configured to move in the direction D2 on the loading platform 400, a lifting and lowering device for lifting and lowering the loading platform 400, and a travel device configured to move the loading platform 400 along the rail 402 in the direction D1. The conveyor device 41 is, for example, a belt conveyor.

FIG. 6 shows one example of the supply device 5 and the discharge device 6. The discharge device 6 is configured to discharge the culture solution L1 in the plurality of cultivation vessels 3 disposed in the cultivation unit 2 at once. The discharge device 6 includes, for example, a main pipe 60 having a linear shape and a plurality of L-shaped connecting pipes 61 communicated with the main pipe 60. The number of connecting pipes 61 is the same as the number of cultivation vessels 3 disposed in the cultivation unit 2.

As illustrated in FIG. 7, a pressing piece 62 and a plurality of support pieces 63 are provided at one end (upstream end) of each of the plurality of connecting pipes 61 in the direction D3. The pressing piece 62 is configured to press the shaft 34 of the switching valve 32. The plurality of support pieces 63 are configured to support the pressing piece 62.

The plurality of support pieces 63 are located at intervals. Between the plurality of support pieces 63, the culture solution L1 can pass.

The pressing piece 62 of the connecting pipe 61 is pressed against the shaft 34 of the switching valve 32, and thereby, the closure plate 33 moves to the one side (the upper side) in the direction D3 to open the drain hole 304. Thus, the culture solution L1 is discharged from the drain hole 304, and the culture solution L1 is discharged through the connecting pipe 61 and the main pipe 60. Pressing the pressing pieces 62 of the plurality of connecting pipes 61 against the shaft 34 of the plurality of cultivation vessels 3 allows the culture solution L1 in the plurality of cultivation vessels 3 to be discharged at once.

As illustrated in FIG. 6, the supply device 5 is configured to supply the new culture solution L2 at once to the plurality of cultivation vessels 3 disposed in the cultivation unit 2. The supply device 5 includes, for example, a main pipe 50 which has a linear shape, a plurality of L-shaped connecting pipes 51 communicated with the main pipe 50, a tank 52 connected to an upstream end (lower end) of the main pipe 50, and a pump 53 disposed between the tank 52 and the main pipe 50. The number of connecting pipes 51 is the same as the number of cultivation vessels 3 disposed in the cultivation unit 2. The supply device 5 inserts downstream ends of the plurality of connecting pipes 51 into the injection holes 311 of the plurality of cultivation vessels 3 and drives the pump 53, thereby supplying the new culture solution L2 in the tank 52 to the plurality of cultivation vessels 3 at once. The new culture solution L2 including air (oxygen) mixed therein is supplied to the plurality of cultivation vessels 3.

The supply device 5 includes a plurality of tanks 52. The plurality of tanks 52 reserve culture solutions L2 of different components. The supply device 5 selects one tank 52 from the plurality of tanks 52 and connects the one tank 52 to the main pipe 50, thereby selecting the culture solution L2 to be supplied. The component of the culture solution L2 reserved in each tank 52 is accordingly set to correspond to the growing phase of the plants P1 and/or the kind of the plants P1.

Subsequently, a cultivation method will be described in which the plants P1 are cultivated by the above-described cultivation equipment.

The cultivation method includes a cultivation step S1, an exporting step S2, a working step S3, and an importing step S4.

As illustrated in FIGS. 2 and 3, the cultivation step S1 is a step of cultivating the plants P1 in a state where the plurality of cultivation units 2 are disposed in the storage rack 1. The plurality of cultivation vessels 3 are disposed on the support plates 20 of the plurality of cultivation units 2. The plurality of cultivation vessels 3 hold the plants P1 and the culture solution L1.

In the cultivation step S1, electric power is supplied from the electricity transmitter 12 of the storage rack 1 to the electricity receiver 23 of each cultivation unit 2. Thus, the plurality of plants P1 held by the plurality of cultivation vessels 3 of each cultivation unit 2 are irradiated with light for growth from the plurality of LED lamps 220 of the irradiation device 22 of each cultivation unit 2, and cultivation of the plants P1 are prompted.

The exporting step S2 is a step of exporting at least one cultivation unit 2 (in the present embodiment, one cultivation unit 2) of the plurality of cultivation units 2 by the transportation device 4 to the workstation A1 apart from the storage rack 1.

In the exporting step S2, the stacker crane 40 picks up one cultivation unit 2 from the storage rack 1 and places the one cultivation unit 2 on the conveyor device 410, and as illustrated in FIG. 1, the conveyor device 410 transports the one cultivation unit 2 to the workstation A1 in the workroom 102.

The working step S3 is a step of performing, in the workstation A1, various types of processes on the plurality of cultivation vessels 3 disposed in the at least one cultivation unit 2 (in the present embodiment, one cultivation unit 2) and at least supplying the new culture solution L2 to the plurality of cultivation vessels 3. The new culture solution L2 contains components according to growing phases of the plants P1. In the present embodiment, the working step S3 includes a discharge step S30, a supply step S31, and an inspection step S32.

The discharge step S30 is a step of discharging the culture solution L1 held by the plurality of cultivation vessels 3 disposed in the cultivation unit 2. The supply step S31 is a step of supplying the new culture solution L2 to the plurality of cultivation vessels 3 disposed in the cultivation unit 2. The supply step S31 is performed after the discharge step S30.

Specifically, the discharge step S30 includes connecting the plurality of connecting pipes 61 of the discharge device 6 to the plurality of cultivation vessels 3 disposed in one cultivation unit 2 on a one-to-one basis as illustrated in FIG. 6 to discharge the culture solution L1 in the plurality of cultivation vessels 3 at once. In the supply step S31, the plurality of connecting pipes 51 of the supply device 5 are connected to the plurality of cultivation vessels 3 disposed in the one cultivation unit 2 on a one-to-one basis to supply the new culture solution L2 to the plurality of cultivation vessels 3. At this time, one tank 52 to be connected to the main pipe 50 is selected from the plurality of tanks 52, and thereby, the culture solution L2 having a component corresponding to the growing phase of the plants P1 is supplied to each of the plurality of cultivation vessels 3.

The inspection step S32 is a step of inspecting the state of the plants P1 held by the plurality of cultivation vessels 3. In the inspection step S32, the pH values and the Electric Conductivity (EC) value of the culture solution L1 in the plurality of cultivation vessels 3 may be measured for inspection of the state of the culture solution L1. Moreover, the working step S3 may include a removal step of removing foreign substances in the plurality of cultivation vessels 3. In the removal step, for example, the interior of each of the plurality of cultivation vessels 3 is washed through the injection hole 311 by a high-pressure washer or the like to remove pieces of the plants P1 and/or foreign substances such as fine algae (blue-green algae).

The importing step S4 is a step of importing, into the storage rack 1 from the workstation A1, the at least one cultivation unit 2, for which the supplying of the new culture solution L2 is completed, by the transportation device 4.

Specifically, as illustrated in FIG. 1, in the importing step S4, the conveyor device 41 transports one cultivation unit 2 from the workstation A1 in the workroom 102 to the cultivation chamber 101, and the stacker crane 40 imports the one cultivation unit 2 into the storage rack 1. At this time, the one cultivation unit 2 is imported into the storage space A3, from which the one cultivation unit 2 is originally exported, in the storage rack 1. When the cultivation unit 2 is accommodated in the storage rack 1, electric power supply is performed between the electricity transmitter 12 of the storage rack 1 and the electricity receiver 23 of the cultivation unit 2, and the irradiation device 22 of the cultivation unit 2 starts emitting light for growth.

The cultivation method repeatedly performs the above-described cultivation step S1, exporting step S2, working step S3, and importing step S4. The number and the timings of repeating steps S1, S2, S3, and S4 are accordingly set in accordance with the rate of a reduction in concentration of components in the culture solutions L1 and L2 in the cultivation vessels 3 and/or the growing phase of the plants P1.

The cultivation method further includes a planting step S5, an importing step S6, an exporting step S7, a harvesting step S8, and a cleaning step S9.

The planting step S5 is a step of, in the workstation A2 in the workroom 103 (FIG. 1), planting seedings of the plants P1 in the plurality of opening 310 of the plurality of cultivation vessels 3, supplying the culture solution L1 to the plurality of cultivation vessels 3, and disposing each of the plurality of cultivation vessels 3 holding the plants P1 and the culture solution L1 in a corresponding one of the support plates 20 in the cultivation unit 2. Note that the supplying of the culture solution L1 to the plurality of cultivation vessels 3 may be performed after the plurality of cultivation vessels 3 holding only the plants P1 are disposed in the cultivation unit 2. In this case, the supplying of culture solution L1 may be performed by a supply device having a similar structure to the supply device 5.

The importing step S6 is a step importing, into the storage rack 1 from the workroom 103, the one cultivation unit 2, for which planting is completed in the workroom 103. Specifically, in the importing step S6, the conveyor device 411 transports one cultivation unit 2 from the workroom 103 to the cultivation chamber 101, and the stacker crane 40 imports the one cultivation unit 2 in the storage rack 1.

The exporting step S7 is a step of exporting one cultivation unit 2 in which the cultivation vessels 3 holding plants P1 that have grown to a harvestable state from the storage rack 1 to the workstation A2 in the workroom 103. Specifically, in the exporting step S7, the stacker crane 40 picks up one cultivation unit 2 from the storage rack 1 and places the one cultivation unit 2 on the conveyor device 411, and the conveyor device 411 transports the one cultivation unit 2 to the workstation A2 in the workroom 103.

The harvesting step S8 is a step of, in the workstation A2, taking out the plurality of cultivation vessels 3 from the one cultivation unit 2 to harvest the plurality of plants P1 held by the plurality of cultivation vessels 3. Taking out of the plurality of cultivation vessels 3 from the cultivation unit 2 may be performed after the culture solution L2 is discharged from each cultivation vessel 3 by using a discharge device having a similar structure to the discharge device 6. In this case, since the weight of the plurality of cultivation vessels 3 is reduced, the plurality of cultivation vessels 3 are easily taken out.

The cleaning step S9 is a step of washing the cultivation vessels 3 from which harvesting of the plants P1 is completed. Specifically, in the cleaning step S9, the culture solution L2 is discharged from the cultivation vessel 3, and the interior of the cultivation vessel 3 is washed by a high-pressure washer or the like. The cultivation vessel 3, for which washing is completed, may be used in the planting step S5.

The cultivation method may further include a preharvest inspection step S10 performed before the harvesting step S8. In the preharvest inspection step S10, the state of the plurality of plants P1 (how the plants P1 are growing) held by the plurality of cultivation vessels 3 on the cultivation unit 2 is inspected in the workstation A2. Performing the preharvest inspection step S10 before the harvesting step S8 prevents the plants P1 from being harvested in a poorly grown state.

In the cultivation method of the present embodiment described above, the planting step S5 and the importing step S6 are performed, and then, the cultivation step S1, the exporting step S2, the working step S3, and the importing step S4 are repeated, and thereafter, the exporting step S7, the preharvest inspection step S10, and the harvesting step S8 are performed. In this way, processes from planting to harvesting of the plants P1 can be performed.

In the above-described cultivation equipment of the present embodiment, the cultivation unit 2 is transported from the storage rack 1 to the workstation A1, and in the workstation A1, discharging of the culture solution L1 from and supplying of the new culture solution L2 to the plurality of cultivation vessels 3 on the cultivation unit 2 (i.e., replacement of the culture solution L1 with the culture solution L2) can be performed.

Thus, in the cultivation equipment of the present embodiment, equipment (pipes and a pump) for discharging and supplying the culture solutions L1 and L2 from and to the plurality of cultivation vessels 3 does not have to be provided to the storage rack 1 or the cultivation unit 2, and thus, complication and an increase in size of the storage rack 1 and the cultivation unit 2 can be prevented. Moreover, since installation of the equipment for discharging and supplying the culture solution L1 and L2 is not required, the construction cost can be reduced.

Moreover, in the cultivation equipment of the present embodiment, equipment for discharging and supplying the culture solution L1 and L2 does not have to be provided to the storage rack 1 or the cultivation unit 2. Therefore, simplification of structures and a reduction in weight of the storage rack 1 and the cultivation unit 2 are possible, and the height of the storage rack 1 is thus easily increased, so that the yield amount per unit area is easily increased.

Moreover, in the cultivation equipment of the present embodiment, steps S1, S2, S3, and S4 are regularly repeated, and thereby, the culture solution L2 containing components corresponding to the growing phase of the plants P1 can be supplied to each cultivation vessel 3, which enables cultivation of plants P1 having further improved quality. For example, in the cultivation equipment of the present embodiment, plants P1 with a low content of a prescribed component (e.g., nitrate nitrogen) can be harvested.

Moreover, in the cultivation equipment of the present embodiment, culture solutions L2 having different components may be supplied to respective cultivation units 2. In this case, a plurality of kinds of plants P1 may be cultivated in one storage rack 1.

Moreover, in the cultivation equipment of the present embodiment, the irradiation device 22 is provided to the cultivation unit 2, the electricity transmitter 12 configured to supply electric power to the irradiation device 22 is provided to the storage rack 1, and electric power supply is performed between the electricity transmitter 12 and the electricity receiver 23 of the irradiation device 22. The construction cost is thus reduced in the cultivation equipment of the present embodiment as compared to a case where a large number of LED lamps 220 of the irradiation device 22 is attached to the storage rack 1.

Moreover, in the cultivation equipment of the present embodiment, the irradiation device 22 is provided to the cultivation unit 2. Therefore, performing maintenance of the irradiation device 22 in the workroom 102 is also possible.

Moreover, in the cultivation equipment of the present embodiment, electric power supply to the irradiation device 22 can be stopped during transportation of the cultivation unit 2, and a short circuit is prevented from being formed due to the culture solutions L1 and L2 fallen from the cultivation vessels 3.

Moreover, in the cultivation equipment of the present embodiment, the cultivation unit 2 accommodated at a high location in the storage rack 1 can be transported by the transportation device 4 to a height closer to the floor of the workroom 102. Thus, in the cultivation equipment of the present embodiment, an exchange process of the culture solutions L1 and L2 of the plurality of cultivation vessels 3 of the cultivation unit 2 is performed at a safe height and is thus easily performed.

Moreover, in the cultivation equipment of the present embodiment, the cultivation chamber 101 in which the plants P1 are cultivated and the workroom 102 in which the exchange process of the culture solutions L1 and L2 are different rooms. Therefore, the cultivation equipment of the present embodiment enables an environment suitable for cultivation of the plants P1 to be created in the cultivation chamber 101 and in addition, enables an environment suitable for processes to be created in the workroom 102. Thus, the environment is optimized in each room. Moreover, an environment with reduced variations in temperature, humidity, and air conditioning is easily kept in the cultivation chamber 101. Moreover, since worker's comings in and goings out of the cultivation chamber 101 can be reduced, troubles in growth of the plants P1 caused by foreign substances (e.g., bugs and mold) adhering to the worker and entering the cultivation chamber 101 are reduced.

Moreover, in the cultivation equipment of the present embodiment, each of the discharge device 6 and the supply device 5 is configured to discharge the culture solution L1 and supply the new culture solution L2 from and to the plurality of cultivation vessels 3 of the cultivation unit 2 at once. Thus, in the cultivation equipment of the present embodiment, a process time for the exchange process of the culture solutions L1 and L2 for one cultivation unit 2 can be reduced, and process efficiency can be improved.

Moreover, in the cultivation equipment of the present embodiment, each of the plurality of cultivation vessels 3 has the projections 302 and 303 for wave dissipation, and the tray 30 and the planting panel 31 are fixed. Thus, in the cultivation equipment of the present embodiment, the culture solution L1(L2) is suppressed from falling from each cultivation vessel 3 during transportation of the cultivation unit 2 by the transportation device 4.

Variation

The cultivation equipment and the cultivation method of the present embodiment is not limited to the configurations described above but may adopt variations as described below.

The stacker crane 40 of the transportation device 4 is not limited to a crane that transports one cultivation unit 2 but may be a crane that transports two or more cultivation units 2 at once.

Moreover, the number of stacker cranes 40 to be disposed between each pair of storage racks 1 is not limited to one, but a plurality of stacker cranes may be provided.

The workstation A1 at which the exchange process of the culture solutions L1 and L2 is performed is at least a space apart from the storage rack 1. The workstation A1 is not limited to a space in the workroom 102 different from the cultivation chamber 101 but may be a partial space in the cultivation chamber 101.

The discharge device 6 is not limited to a device configured to discharge the culture solution L1 from the plurality of cultivation vessels 3 on the cultivation unit 2 at once but may be a device configured to discharge the culture solution L1 from the plurality of cultivation vessels 3 one by one. Moreover, the supply device 5 is not limited to a device configured to supply the new culture solution L2 to the plurality of cultivation vessels 3 on the cultivation unit 2 at once but may be a device configured to supply the new culture solution L2 to the plurality of cultivation vessels 3 one by one.

The new culture solution L2 supplied from the supply device 5 may be liquid having the same components as the culture solution L1 which has just been supplied.

The irradiation device 22 may be included in, not the cultivation unit 2, but the storage rack 1. In this case, the irradiation devices 22 are provided in multiple stages in storage rack 1 such that light for growth is emitted to the plurality of cultivation vessels 3 on the cultivation unit 2, and the irradiation devices 22 are provided at locations where exporting and importing of the cultivation unit 2 are not obstructed.

The cultivation building 100 may have a plurality of workrooms 102 in which the exchange process of the culture solutions L1 and L2 is performed. The number of workrooms 102 may be accordingly set in accordance with the yield amount required per unit time. Moreover, the plurality of workrooms 102 may be provided on different floors of the cultivation building 100. In this case, the transportation distance from the storage rack 1 to the workstation A1 can be reduced, thereby reducing the transportation time and improving process efficiency.

The cultivation building 100 does not have to have the workroom 103 in which harvesting and planting of plants P1 are performed. The cultivation building 100 may separately have a planting chamber in which the plants P1 are planted and a harvesting chamber in which the plants P1 are harvested. The number of the planting chambers and harvesting chambers may be accordingly set.

Moreover, the workstation A2, in which planting of the plant P1 and harvesting plant P1 are performed, may be a partial space in the cultivation chamber 101.

The transportation device 4 is not limited to a combination of the stacker crane 40 and the conveyor device 41 but may include only the stacker crane 40. In this case, the stacker crane 40 is configured to transport the cultivation unit 2 to the workrooms 102 and 103.

Electric power supply may be performed between the electricity transmitter 12 and the electricity receiver 23 when contacted to each other.

The LED lamp 220 is not limited to a linear lamp but may be a flat plate-like lamp.

The storage rack 1 may have a structure configured to support the rectangular rack plate by the plurality of support pillars 11.

The size of each of the storage rack 1, the cultivation unit 2, and the cultivation vessel 3 may be accordingly changed based on the yield amount required per unit time and/or required process efficiency.

The cultivation equipment is not limited to equipment for hydroponic culture of plants P1 but may be equipment for nutriculture of plants P1 planted in a solid medium.

In this case, the cultivation equipment includes a storage rack 1, a plurality of cultivation units 2, a plurality of cultivation vessels 3, a transportation device 4, and a supply device 5. However, the cultivation equipment does not include the discharge device 6. The cultivation vessel 3 includes the tray 30 and the solid medium accommodated in the tray 30 but does not include the planting panel 31. The solid medium is a mat-like member in which the culture solution L1 (L2) is penetrable and is made of, for example, rock wool, pebbles, chaff, coconut husk, or peat moss.

The cultivation method adopting the cultivation equipment includes a cultivation step S1, an exporting step S2, a working step S3, and an importing step S4. The working step S3 includes the supply step S31 and does not include the discharge step S30. The working step S3 optionally includes the inspection step S32. In the supply step S31, the new culture solution L2 is supplied to the tray 30, and thereby, the new culture solution L2 permeates the solid medium. Note that at this time, part of the new culture solution L2 which does not permeate the solid medium may be discharged by a similar device to the discharge device 6.

Also in this cultivation equipment and this cultivation method, equipment configured to supply and discharge the culture solutions L1 and L2 does not have to be provided to the storage rack 1 or the cultivation unit 2, and complication and/or an increase in size of the storage rack 1 and the cultivation unit 2 can be prevented. Moreover, also in this cultivation equipment and the cultivation method, simplification of structures and a reduction in weight of the storage rack 1 and the cultivation unit 2 are possible, and the height of the storage rack 1 is thus easily increased, so that the yield amount per unit area is easily increased.

SUMMARY

As in the cultivation method of the one embodiment and its variations described above, a cultivation method of a first aspect includes the following configuration.

That is, a cultivation method of a first aspect includes a cultivation step (S1), an exporting step (S2), a working step (S3), and an importing step (S4). The cultivation step (S1) is a step of cultivating plants (P1) in a state where a plurality of cultivation units (2) disposed are accommodated in a storage rack (1). A plurality of cultivation vessels (3) are disposed in the plurality of cultivation units (2). Each of the plurality of cultivation vessels (3) holds the plants (P1) and culture solution (L1). The exporting step (S2) is a step of transporting at least one cultivation unit (2) of the plurality of cultivation units (2) by a transportation device (4) from the storage rack to a workstation (A1) apart from the storage rack (1). The working step (S3) is a step of supplying a new culture solution (L2) to the plurality of cultivation vessels (3) disposed in the at least one cultivation unit (2) at the workstation (A1). The importing step (S4) is a step of importing, into the storage rack (1) from the workstation (A1), the at least one cultivation unit (2), for which the supplying of the new culture solution (L2) is completed, by the transportation device (4). The cultivation method of the first aspect repeatedly performs the cultivation step (S1), the exporting step (S2), the working step (S3), and the importing step (S4) in this order.

Since the cultivation method of the first aspect has the configuration described above, equipment configured to supply and discharge the culture solutions (L1, L2) does not have to be provided to the storage rack (1) or the cultivation unit (2), which prevents complication and/or an increase in size of the storage rack (1) and the cultivation unit (2). Moreover, in the cultivation method of the first aspect, simplification of the structures and a reduction in weight of the storage rack (1) and the cultivation unit (2) are possible, and the height of the storage rack (1) is thus easily increased, so that the yield amount per unit area is easily increased.

As in the cultivation method of the one embodiment and its variations, a cultivation method of a second aspect includes, in addition to the configuration of the cultivation method of the first aspect, the following configuration.

That is, in the cultivation method of the second aspect, the working step (S3) includes a discharge step (S30) of discharging the culture solution (L1) held by the plurality of cultivation vessels (3).

Since the cultivation method of the second aspect has the configuration described above, the culture solution (L1) with reduced concentration of components required for growth of the plants (P1) is discharged from the plurality of cultivation vessels (3), and therefore, the culture solutions (L1, L2) are exchanged.

As in the cultivation method of the one embodiment and its variations, a cultivation method of a third aspect includes, in addition to the configurations of the cultivation method of the first or second aspect, the following configurations.

That is, in the cultivation method of the third aspect, the working step (S3) includes an inspection step (S32) of inspecting a state of the plants (P1) held by the plurality of cultivation vessels (3).

Since the cultivation method of the third aspect has the configuration described above, whether or not the plants (P1) reach a planned growth phase is checked. Thus, in the cultivation method of the third aspect, appropriate processes such as increasing the number of repetitions of the steps (S1, S2, S3, S4) or modifying the component concentration of the new culture solution (L2) to be supplied are easily performed.

As in the cultivation method of the one embodiment and its variations, a cultivation method of a fourth aspect includes, in addition to the configurations of the cultivation method of any one of the first to third aspect, the following configurations.

That is, in the cultivation method of the fourth aspect, the new culture solution (L2) contains a component corresponding to a growth phase of the plants (P1).

Since the cultivation method of the fourth aspect has the configuration described above, plants (P1) having further improved quality are cultured.

As in the cultivation equipment of the one embodiment and its variations, a cultivation equipment of a fifth aspect includes the following configurations.

That is, the cultivation equipment of the fifth aspect includes a storage rack (1), a plurality of cultivation units (2), a plurality of cultivation vessels (3), a transportation device (4), and a supply device (5). The plurality of cultivation units (2) are configured to be accommodated in the storage rack (1). The plurality of cultivation vessels (3) are provided to each of the plurality of cultivation units (2). Each of the plurality of cultivation vessels (3) is configured to hold the plants (P1) and a culture solution (L1). The transportation device (4) is configured to transport at least one cultivation unit (2) of the plurality of cultivation units (2) between the storage rack (1) and a workstation (A1) apart from the storage rack (1). The supply device (5) is configured to supply a new culture solution (L2) to the plurality of cultivation vessels (3) disposed in the at least one cultivation unit (2) at the workstation (A1).

Since the cultivation equipment of the fifth aspect has the configuration described above, equipment configured to supply and discharge the culture solutions (L1, L2) does not have to be provided to the storage rack (1) or the cultivation unit (2), which prevents complication and/or an increase in size of the storage rack (1) and the cultivation unit (2). Moreover, in the cultivation equipment of the fifth aspect, simplification of the structures and a reduction in weight of the storage rack (1) and the cultivation unit (2) are possible, and the height of the storage rack (1) is thus easily increased, so that the yield amount per unit area is easily increased.

As in the cultivation equipment of the one embodiment and its variations, a cultivation equipment of a sixth aspect includes, in addition to the configurations of the cultivation equipment of the fifth aspect, the following configurations.

That is, the cultivation equipment of the sixth aspect further includes a discharge device (6) configured to, in the workstation (A1), discharge the culture solution (L1) held by the plurality of cultivation vessels (3).

Since the cultivation equipment of the sixth aspect has the configuration described above, the culture solution (L1) with reduced concentration of components required for growth of the plants (P1) is discharged by the discharge device (6) from the plurality of cultivation vessels (3), and therefore, the culture solutions (L1, L2) are exchanged.

As in the cultivation equipment of the one embodiment and its variations, a cultivation equipment of a seventh aspect includes, in addition to the configurations of the cultivation equipment of the fifth or sixth aspect, the following configurations.

That is, in the cultivation equipment of the seventh aspect, each of the plurality of cultivation units (2) includes an irradiation device (22) configured to emit light for growth toward the plurality of cultivation vessels (3), and the storage rack (1) has an electricity transmitter (12) configured to supply electric power to the irradiation device (22).

Since the cultivation equipment of the seventh aspect has the configuration described above, labor of construction can be reduced, maintenance of the irradiation device (22) is easily performed, and the height of the storage rack (1) is easily increased as compared to a case where the irradiation device (22) is provided to the storage rack (1).

As in the cultivation apparatus of the one embodiment and its variations, a cultivation apparatus of an eighth aspect includes the following configurations.

That is, the cultivation apparatus of the eighth aspect includes a storage rack (1), a plurality of cultivation units (2), and a plurality of cultivation vessels (3). The plurality of cultivation units (2) are configured to be removably and insertably accommodated in the storage rack (1). The plurality of cultivation vessels (3) are disposed in each of the plurality of cultivation units (2). Each of the plurality of cultivation vessels (3) is configured to hold the plants (P1) and a culture solution (L1).

Since the cultivation apparatus of the eighth aspect has the configuration described above, the cultivation unit (2) is taken out of the storage rack (1), and a new culture solution (L2) is supplied to the plurality of cultivation vessels (3) on the cultivation unit (2). Thus, in the cultivation unit of the eighth aspect, equipment configured to supply and discharge the culture solutions (L1, L2) does not have to be provided to the storage rack (1) or the cultivation unit (2), which prevents complication and/or an increase in size of the storage rack (1) and the cultivation unit (2). Moreover, in the cultivation apparatus of the eighth aspect, simplification of the structures and a reduction in weight of the storage rack (1) and the cultivation unit (2) are possible, and the height of the storage rack (1) is thus easily increased, so that the yield amount per unit area is easily increased.

As in the cultivation apparatus of the one embodiment and its variations, a cultivation apparatus of a ninth aspect includes, in addition to the configurations of the cultivation apparatus of the eighth aspect, the following configurations.

That is, in the cultivation apparatus of the ninth aspect, each of the plurality of cultivation units (2) includes an irradiation device (22) configured to emit light for growth toward the plurality of cultivation vessels (3), and the storage rack (1) has an electricity transmitter (12) configured to supply electric power to the irradiation device (22).

Since the cultivation apparatus of the ninth aspect has the configuration described above, labor of construction can be reduced, maintenance of the irradiation device (22) is easily performed, and the height of the storage rack (1) is easily increased as compared to a case where the irradiation device (22) is provided to the storage rack (1).

The present disclosure has been described based on the embodiment illustrated in the drawings. However, the present disclosure is not limited to the embodiment but may be accordingly modified in design without departing from the intended scope of the present disclosure.

REFERENCE SIGNS LIST

1 STORAGE RACK
12 ELECTRICITY TRANSMITTER
2 CULTIVATION UNIT
22 IRRADIATION DEVICE
3 CULTIVATION VESSEL
4 TRANSPORTATION DEVICE
5 SUPPLY DEVICE
6 DISCHARGE DEVICE
A1 WORKSTATION
P1 PLANT
L1 CULTURE SOLUTION
L2 CULTURE SOLUTION (NEW CULTURE SOLUTION)
S1 CULTIVATION STEP
S2 EXPORTING STEP
S3 WORKING STEP
S4 IMPORTING STEP
S30 DISCHARGE STEP
S32 INSPECTION STEP

The invention claimed is:

1. A cultivation method, comprising:
    a cultivation step of cultivating plants in a state where a plurality of cultivation units are accommodated in a storage rack, a plurality of cultivation vessels being disposed in the plurality of cultivation units, each of the plurality of cultivation vessels holding the plants and a culture solution;
    an exporting step of exporting at least one cultivation unit of the plurality of cultivation units by a transportation device from the storage rack to a workstation apart from the storage rack;
    a working step of supplying a new culture solution to the plurality of cultivation vessels disposed in the at least one cultivation unit at the workstation; and
    an importing step of importing, into the storage rack from the workstation, the at least one cultivation unit, for which the supplying of the new culture solution is completed, by the transportation device,
    the cultivation step, the exporting step, the working step, and the importing step being repeatedly performed in this order.

2. The cultivation method of claim 1, wherein
    the working step includes a discharge step of discharging the culture solution held by the plurality of cultivation vessels.

3. The cultivation method of claim 2 wherein the working step includes an inspection step of inspecting a state of the plants held by the plurality of cultivation vessels.

4. The cultivation method of claim 3, wherein the new culture solution contains a component corresponding to a growth phase of the plants.

5. The cultivation method of claim 2, wherein the new culture solution contains a component corresponding to a growth phase of the plants.

6. The cultivation method of claim 1, wherein the working step includes an inspection step of inspecting a state of the plants held by the plurality of cultivation vessels.

7. The cultivation method of claim 6, wherein the new culture solution contains a component corresponding to a growth phase of the plants.

8. The cultivation method of claim 1, wherein the new culture solution contains a component corresponding to a growth phase of the plants.

9. Cultivation equipment, comprising:
a storage rack;
a plurality of cultivation units configured to be accommodated in the storage rack;
a plurality of cultivation vessels disposed in each of the plurality of cultivation units, each of the plurality of cultivation vessels being configured to hold plants and a culture solution;
a transportation device configured to transport at least one cultivation unit of the plurality of cultivation units between the storage rack and a workstation apart from the storage rack; and
a supply device configured to supply a new culture solution to the plurality of cultivation vessels disposed in the at least one cultivation unit at the workstation.

10. The cultivation equipment of claim 9, further comprising
a discharge device configured to, in the workstation, discharge the culture solution held by the plurality of cultivation vessels.

11. The cultivation equipment of claim 10, wherein each of the plurality of cultivation units includes an irradiation device configured to emit light for growth toward the plurality of cultivation vessels, and
the storage rack has an electricity transmitter configured to supply electric power to the irradiation device.

12. The cultivation equipment of claim 9, wherein each of the plurality of cultivation units includes an irradiation device configured to emit light for growth toward the plurality of cultivation vessels, and
the storage rack has an electricity transmitter configured to supply electric power to the irradiation device.

* * * * *